(12) United States Patent
Wakino

(10) Patent No.: US 7,051,370 B2
(45) Date of Patent: May 23, 2006

(54) CONTENT-CERTIFIED E-MAIL SERVICE SYSTEM

(75) Inventor: Atsushi Wakino, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 885 days.

(21) Appl. No.: 09/734,560

(22) Filed: Dec. 13, 2000

(65) Prior Publication Data

US 2001/0027523 A1    Oct. 4, 2001

(30) Foreign Application Priority Data

Apr. 3, 2000    (JP)    .............................. 2000-100802

(51) Int. Cl.
*H04N 7/16* (2006.01)
(52) U.S. Cl. ........................................ 726/30; 713/175
(58) Field of Classification Search ................ 713/178, 713/176, 201; 379/93.24
See application file for complete search history.

(56) References Cited

U.S. PATENT DOCUMENTS

| | | | |
|---|---|---|---|
| 5,553,145 A * | 9/1996 | Micali | .......................... 380/30 |
| 5,566,230 A | 10/1996 | Cairo | |
| 5,809,116 A | 9/1998 | Cairo | |
| 5,815,555 A | 9/1998 | Cairo | |
| 5,956,154 A | 9/1999 | Cairo | |
| 5,982,506 A * | 11/1999 | Kara | .......................... 358/405 |
| 6,263,436 B1 * | 7/2001 | Franklin et al. | ............. 713/167 |
| 6,360,254 B1 * | 3/2002 | Linden et al. | ............... 709/219 |
| 6,618,749 B1 * | 9/2003 | Saito et al. | .................. 709/207 |

* cited by examiner

*Primary Examiner*—Kim Vu
*Assistant Examiner*—Andrew L. Nalven
(74) *Attorney, Agent, or Firm*—Rabin & Berdo, PC

(57) ABSTRACT

A content-certified e-mail service system in which an e-mail terminal device at a sender's side sends a content certification request e-mail containing an e-mail address of an e-mail terminal device at a receiver's side and a text of content certification to an e-mail content certifying device; upon receipt of the content certification request e-mail, the e-mail content certifying device judges whether there is any tampering with the text of content certification in the e-mail, and upon judging that there is no tampering with the text of content certification, saves registration information containing the text of content certification in a storage device, and sends a content-certified e-mail containing the text of content certification to the e-mail terminal device at the receiver's side and a receipt e-mail containing receipt information indicating that the content certification has been effected to the e-mail terminal device at the sender's side.

5 Claims, 15 Drawing Sheets

FIG. 3

BODY PORTION OF CONTENT CERTIFICATION REQUEST E-MAIL (a) SENDER'S INFORMATION
(a-1) SENDER'S NAME
(a-2) SENDER'S ADDRESS
(a-3) SENDER'S E-MAIL ADDRESS (b) RECEIVER'S INFORMATION
(b-1) RECEIVER'S NAME
(b-2) RECEIVER'S ADDRESS
(b-3) RECEIVER'S E-MAIL ADDRESS (c) SETTLEMENT INFORMATION
(c-1) SENDER'S CREDIT CARD NUMBER
(c-2) PIN OF CREDIT CARD (d) TEXT INFORMATION OF CONTENT CERTIFICATION
(d-1) TEXT
(d-2) SENDER'S DIGITAL SIGNATURE (e) DIGITAL CERTIFICATE INFORMATION
(e-1) SENDER'S DIGITAL CERTIFICATE

FIG. 4

| INFORMATION TITLES | INFORMATION ITEMS | PARTICULARS |
|---|---|---|
| (a) SENDER'S INFORMATION | (a-1) SENDER'S NAME | NAME OF SENDER REQUESTING CONTENT CERTIFICATION |
| | (a-2) SENDER'S ADDRESS | ADDRESS OF SENDER |
| | (a-3) SENDER'S E-MAIL ADDRESS | E-MAIL ADDRESS OF SENDER |
| (b) RECEIVER'S INFORMATION | (b-1) RECEIVER'S NAME | NAME OF RECEIVER TO BE RECEIVED CONTENT-CERTIFIED E-MAIL |
| | (b-2) RECEIVER'S ADDRESS | ADDRESS OF RECEIVER |
| | (b-3) RECEIVER'S E-MAIL ADDRESS | E-MAIL ADDRESS OF RECEIVER |
| (c) SETTLEMENT INFORMATION | (c-1) SENDER'S CREDIT CARD NUMBER | SENDER'S CREDIT CARD NUMBER TO WHICH CONTENT CERTIFICATION SERVICE FEE IS CHARGED |
| | (c-2) PIN OF CREDIT CARD | PIN OF CREDIT CARD |
| (d) TEXT INFORMATION OF CONTENT CERTIFICATION | (d-1) TEXT | TEXT OF CONTENT CERTIFICATION |
| | (d-2) SENDER'S DIGITAL SIGNATURE | SENDER'S DIGITAL SIGNATURE FOR (d-1) TEXT |
| (e) DIGITAL CERTIFICATE INFORMATION | (e-1) SENDER'S DIGITAL CERTIFICATE | DIGITAL CERTIFICATE OF SENDER ISSUED BY AUTHORIZED VERIFICATION ORGANIZATION |

FIG. 5

| INFORMATION ITEMS | PARTICULARS | INFORMATION SOURCES |
|---|---|---|
| (x-1) SENDER'S IDENTIFIER | SENDER'S IDENTIFIER USED IN IDENTIFYING CONTENT CERTIFICATE | ISSUED IN E-MAIL CONTENT CERTIFYING DEVICE |
| (x-2) RECEIVER'S IDENTIFIER | RECEIVER'S IDENTIFIER USED IN IDENTIFYING CONTENT CERTIFICATE | ISSUED IN E-MAIL CONTENT CERTIFYING DEVICE |
| (y-1) ACCEPTANCE DATE AND TIME | INFORMATION OF DATE AND TIME WHEN E-MAIL CONTENT CERTIFYING DEVICE RECEIVED CONTENT CERTIFICATION REQUEST E-MAIL | ISSUED IN E-MAIL CONTENT CERTIFYING DEVICE |
| (y-2) TRANSFERENCE DATE AND TIME | INFORMATION OF DATE AND TIME WHEN E-MAIL CONTENT CERTIFYING DEVICE SENT CONTENT-CERTIFIED E-MAIL TO RECEIVER SPECIFIED BY SENDER | ISSUED IN E-MAIL CONTENT CERTIFYING DEVICE |
| (y-3) DELIVERY DATE AND TIME | INFORMATION OF DATE AND TIME WHEN DELIVERY OF CONTENT-CERTIFIED E-MAIL SENT FROM E-MAIL CONTENT CERTIFYING DEVICE TO RECEIVER'S E-MAIL ADDRESS SPECIFIED BY SENDER IS CONFIRMED/WHEN DELIVERY IS NOT CONFIRMED, INVALID VALUE | ISSUED IN E-MAIL CONTENT CERTIFYING DEVICE |
| (z-1) DELIVERY INFORMATION | DELIVERY STATE WHEN E-MAIL CONTENT CERTIFYING DEVICE SENDS CONTENT-CERTIFIED E-MAIL TO RECEIVER'S E-MAIL ADDRESS SPECIFIED BY SENDER, FOR EXAMPLE, SENDING, DELIVERY CONFIRMED, DELIVERY FAILED | ISSUED IN E-MAIL CONTENT CERTIFYING DEVICE |
| (a-1) SENDER'S NAME | NAME OF SENDER REQUESTING CONTENT CERTIFICATION | (a) SENDER'S INFORMATION IN CONTENT CERTIFICATION REQUEST E-MAIL |
| (a-2) SENDER'S ADDRESS | ADDRESS OF SENDER | (a) SENDER'S INFORMATION IN CONTENT CERTIFICATION REQUEST E-MAIL |
| (a-3) SENDER'S E-MAIL ADDRESS | E-MAIL ADDRESS OF SENDER | (a) SENDER'S INFORMATION IN CONTENT CERTIFICATION REQUEST E-MAIL |
| (b-1) RECEIVER'S NAME | NAME OF RECEIVER TO BE RECEIVED CONTENT-CERTIFIED E-MAIL | (b) RECEIVER'S INFORMATION IN CONTENT CERTIFICATION REQUEST E-MAIL |
| (b-2) RECEIVER'S ADDRESS | ADDRESS OF RECEIVER | (b) RECEIVER'S INFORMATION IN CONTENT CERTIFICATION REQUEST E-MAIL |
| (b-3) RECEIVER'S E-MAIL ADDRESS | E-MAIL ADDRESS OF RECEIVER | (b) RECEIVER'S INFORMATION IN CONTENT CERTIFICATION REQUEST E-MAIL |
| (d-1) TEXT | TEXT OF CONTENT CERTIFICATION | (d) TEXT INFORMATION OF CONTENT CERTIFICATION IN CONTENT CERTIFICATION REQUEST E-MAIL |
| (d-2) SENDER'S DIGITAL SIGNATURE | SENDER'S DIGITAL SIGNATURE FOR (d-1) TEXT | (d) TEXT INFORMATION OF CONTENT CERTIFICATION IN CONTENT CERTIFICATION REQUEST E-MAIL |
| (e-1) SENDER'S DIGITAL CERTIFICATE | DIGITAL CERTIFICATE FOR SENDER ISSUED BY AUTHORIZED VERIFICATION ORGANIZATION | (e) DIGITAL CERTIFICATE INFORMATION IN CONTENT CERTIFICATION REQUEST E-MAIL |
| (e-2) DIGITAL CERTIFICATE OF E-MAIL CONTENT CERTIFYING DEVICE | DIGITAL CERTIFICATE OF E-MAIL CONTENT CERTIFYING DEVICE ISSUED BY AUTHORIZED VERIFICATION ORGANIZATION | GIVEN TO E-MAIL CONTENT CERTIFYING DEVICE FROM AUTHORIZED VERIFICATION ORGANIZATION |

FIG. 6

BODY PORTION OF CONTENT- CERTIFICATION E-MAIL

(h) CONTENT CERTIFICATE INFORMATION
(h-1) E-MAIL CONTENT CERTIFYING DEVICE IDENTIFIER
(x-2) RECEIVER'S IDENTIFIER
(y-1) ACCEPTANCE DATE AND TIME
(a-1) SENDER'S NAME
(a-2) SENDER'S ADDRESS
(a-3) SENDER'S E-MAIL ADDRESS
(b-1) RECEIVER'S NAME
(b-2) RECEIVER'S ADDRESS
(b-3) RECEIVER'S E-MAIL ADDRESS
(h-2) DIGITAL SIGNATURE OF E-MAIL CONTENT CERTIFYING DEVICE (d) TEXT INFORMATION OF CONTENT CERTIFICATION
(d-1) TEXT
(d-2) SENDER'S DIGITAL SIGNATURE (e) DIGITAL CERTIFICATE INFORMATION
(e-1) SENDER'S DIGITAL CERTIFICATE
(e-2) DIGITAL CERTIFICATE OF E-MAIL CONTENT CERTIFYING DEVICE

FIG. 7

| INFORMATION TITLES | INFORMATION ITEMS | PARTICULARS |
|---|---|---|
| (h) CONTENT CERTIFICATE INFORMATION | (h-1) IDENTIFIER OF E-MAIL CONTENT CERTIFYING DEVICE | IDENTIFIER USED IN IDENTIFYING E-MAIL CONTENT CERTIFYING DEVICE THAT CERTIFIES CONTENTS OF E-MAIL |
| | (x-2) RECEIVER'S IDENTIFIER | RECEIVER'S IDENTIFIER USED IN IDENTIFYING CONTENT CERTIFICATE |
| | (y-1) ACCEPTANCE DATE AND TIME | INFORMATION OF DATE AND TIME WHEN E-MAIL CONTENT CERTIFYING DEVICE ACCEPTED CONTENT CERTIFICATION REQUEST E-MAIL |
| | (a-1) SENDER'S NAME | NAME OF SENDER REQUESTING CONTENT CERTIFICATION |
| | (a-2) SENDER'S ADDRESS | ADDRESS OF SENDER |
| | (a-3) SENDER'S E-MAIL ADDRESS | E-MAIL ADDRESS OF SENDER |
| | (b-1) RECEIVER'S NAME | NAME OF RECEIVER TO BE RECEIVED CONTENT-CERTIFIED E-MAIL |
| | (b-2) RECEIVER'S ADDRESS | ADDRESS OF RECEIVER |
| | (b-3) RECEIVER'S E-MAIL ADDRESS | E-MAIL ADDRESS OF RECEIVER |
| | (h-2) DIGITAL SIGNATURE OF E-MAIL CONTENT CERTIFYING DEVICE | DIGITAL SIGNATURE OF E-MAIL CONTENT CERTIFYING DEVICE FOR ALL THE ABOVE INFORMATION (h-1)–(b-3) |
| (d) TEXT INFORMATION OF CONTENT CERTIFICATION | (d-1) TEXT | TEXT OF CONTENT CERTIFICATION |
| | (d-2) SENDER'S DIGITAL SIGNATURE | SENDER'S DIGITAL SIGNATURE FOR (d-1) TEXT |
| (e) DIGITAL CERTIFICATE INFORMATION | (e-1) SENDER'S DIGITAL CERTIFICATE | DIGITAL CERTIFICATE OF SENDER ISSUED BY AUTHORIZED VERIFICATION ORGANIZATION |
| | (e-2) DIGITAL CERTIFICATE OF E-MAIL CONTENT CERTIFYING DEVICE | DIGITAL CERTIFICATE OF E-MAIL CONTENT CERTIFYING DEVICE ISSUED BY AUTHORIZED VERIFICATION ORGANIZATION |

FIG. 8

BODY PORTION OF RECEIPT E-MAIL (i) CONTENT CERTIFICATE INFORMATION
(i-1) IDENTIFIER OF E-MAIL CONTENT CERTIFYING DEVICE
(x-2) RECEIVER'S IDENTIFIER
(y-1) ACCEPTANCE DATE AND TIME
(y-2) TRANSFERENCE DATE AND TIME
(y-3) DELIVERY DATE AND TIME
(a-1) SENDER'S NAME
(a-2) SENDER'S ADDRESS
(a-3) SENDER'S E-MAIL ADDRESS
(b-1) RECEIVER'S NAME
(b-2) RECEIVER'S ADDRESS
(b-3) RECEIVER'S E-MAIL ADDRESS
(i-2) DIGITAL SIGNATURE OF E-MAIL CONTENT CERTIFYING DEVICE (d) TEXT INFORMATION OF CONTENT CERTIFICATION
(d-1) TEXT
(d-2) SENDER'S DIGITAL SIGNATURE (e) DIGITAL CERTIFICATE INFORMATION
(e-1) SENDER'S DIGITAL CERTIFICATE
(e-2) DIGITAL CERTIFICATE OF E-MAIL CONTENT CERTIFYING DEVICE

FIG. 9

| INFORMATION TITLES | INFORMATION ITEMS | PARTICULARS |
|---|---|---|
| (i) RECEIPT INFORMATION | (i-1) IDENTIFIER OF E-MAIL CONTENT CERTIFYING DEVICE | IDENTIFIER USED IN IDENTIFYING E-MAIL CONTENT CERTIFYING DEVICE THAT CERTIFIES CONTENTS OF E-MAIL |
| | (x-2) RECEIVER'S IDENTIFIER | RECEIVER'S IDENTIFIER USED IN IDENTIFYING CONTENT CERTIFICATE |
| | (y-1) ACCEPTANCE DATE AND TIME | INFORMATION OF DATE AND TIME WHEN E-MAIL CONTENT CERTIFYING DEVICE ACCEPTED CONTENT CERTIFICATION REQUEST E-MAIL |
| | (y-2) TRANSFERENCE DATE AND TIME | INFORMATION OF DATE AND TIME WHEN E-MAIL CONTENT CERTIFYING DEVICE SENT CONTENT-CERTIFIED E-MAIL TO RECEIVER'S E-MAIL ADDRESS SPECIFIED BY SENDER |
| | (y-3) DELIVERY DATE AND TIME | INFORMATION OF DATE AND TIME WHEN DELIVERY OF CONTENT-CERTIFIED E-MAIL SENT FROM E-MAIL CONTENT CERTIFYING DEVICE TO RECEIVER'S E-MAIL ADDRESS SPECIFIED BY SENDER IS CONFIRMED/WHEN DELIVERY IS NOT CONFIRMED, INVALID VALUE |
| | (a-1) SENDER'S NAME | NAME OF SENDER REQUESTING CONTENT CERTIFICATION |
| | (a-2) SENDER'S ADDRESS | ADDRESS OF SENDER |
| | (a-3) SENDER'S E-MAIL ADDRESS | E-MAIL ADDRESS OF SENDER |
| | (b-1) RECEIVER'S NAME | NAME OF SENDING DESTINATION OF CONTENT-CERTIFIED E-MAIL |
| | (b-2) RECEIVER'S ADDRESS | ADDRESS OF RECEIVER |
| | (b-3) RECEIVER'S E-MAIL ADDRESS | E-MAIL ADDRESS OF RECEIVER |
| | (i-2) DIGITAL SIGNATURE OF E-MAIL CONTENT CERTIFYING DEVICE | DIGITAL SIGNATURE OF E-MAIL CONTENT CERTIFYING DEVICE FOR ALL THE ABOVE INFORMATION (i-1)–(b-3) |
| (d) TEXT INFORMATION OF CONTENT CERTIFICATION | (d-1) TEXT | TEXT OF CONTENT CERTIFICATION |
| | (d-2) SENDER'S DIGITAL SIGNATURE | SENDER'S DIGITAL SIGNATURE FOR (d-1) TEXT |
| (e) DIGITAL CERTIFICATE INFORMATION | (e-1) SENDER'S DIGITAL CERTIFICATE | DIGITAL CERTIFICATE OF SENDER ISSUED BY AUTHORIZED VERIFICATION ORGANIZATION |
| | (e-2) DIGITAL CERTIFICATE OF E-MAIL CONTENT CERTIFYING DEVICE | DIGITAL CERTIFICATE OF E-MAIL CONTENT CERTIFYING DEVICE ISSUED BY AUTHORIZED VERIFICATION ORGANIZATION |

FIG. 10

```
BODY PORTION OF REVIEW REQUEST E-MAIL (i) RECEIPT INFORMATION
 (i-1) IDENTIFIER OF E-MAIL CONTENT CERTIFYING DEVICE
 (x-2) RECEIVER'S IDENTIFIER
 (y-1) ACCEPTANCE DATE AND TIME
 (y-2) TRANSFERENCE DATE AND TIME
 (a-1) SENDER'S NAME
 (a-2) SENDER'S ADDRESS
 (a-3) SENDER'S E-MAIL ADDRESS
 (b-1) RECEIVER'S NAME
 (b-2) RECEIVER'S ADDRESS
 (b-3) RECEIVER'S E-MAIL ADDRESS
 (i-2) DIGITAL SIGNATURE OF E-MAIL CONTENT
       CERTIFYING DEVICE
```

FIG. 12

BODY PORTION OF CONTENT CERTIFICATION NOTICE E-MAIL (j) CONTENT CERTIFICATE NOTICE INFORMATION
(j-1) IDENTIFIER OF E-MAIL CONTENT CERTIFYING DEVICE
(x-2) RECEIVER'S IDENTIFIER
(y-1) ACCEPTANCE DATE AND TIME
(a-1) SENDER'S NAME
(a-2) SENDER'S ADDRESS
(a-3) SENDER'S E-MAIL ADDRESS
(b-1) RECEIVER'S NAME
(b-2) RECEIVER'S ADDRESS
(b-3) RECEIVER'S E-MAIL ADDRESS
(j-2) URL INFORMATION OF E-MAIL CONTENT CERTIFYING DEVICE
(j-3) DIGITAL SIGNATURE OF E-MAIL CONTENT CERTIFYING DEVICE (e) DIGITAL CERTIFICATE INFORMATION
(e-1) SENDER'S DIGITAL CERTIFICATE
(e-2) DIGITAL CERTIFICATE OF E-MAIL CONTENT CERTIFYING DEVICE

FIG. 13

| INFORMATION TITLES | INFORMATION ITEMS | PARTICULARS |
|---|---|---|
| (h) CONTENT CERTIFICATION NOTICE INFORMATION | (j-1) IDENTIFIER OF E-MAIL CONTENT CERTIFYING DEVICE | IDENTIFIER USED IN IDENTIFYING E-MAIL CONTENT CERTIFYING DEVICE THAT CERTIFIES CONTENTS OF E-MAIL |
| | (x-2) RECEIVER'S IDENTIFIER | RECEIVER'S IDENTIFIER USED IN IDENTIFYING CONTENT CERTIFICATE |
| | (y-1) ACCEPTANCE DATE AND TIME | INFORMATION OF DATE AND TIME WHEN E-MAIL CONTENT CERTIFYING DEVICE ACCEPTED CONTENT CERTIFICATION REQUEST E-MAIL |
| | (a-1) SENDER'S NAME | NAME OF SENDER REQUESTING CONTENT CERTIFICATION |
| | (a-2) SENDER'S ADDRESS | ADDRESS OF SENDER |
| | (a-3) SENDER'S E-MAIL ADDRESS | E-MAIL ADDRESS OF SENDER |
| | (b-1) RECEIVER'S NAME | NAME OF RECEIVER TO BE RECEIVED CONTENT-CERTIFIED E-MAIL |
| | (b-2) RECEIVER'S ADDRESS | ADDRESS OF RECEIVER |
| | (b-3) RECEIVER'S E-MAIL ADDRESS | E-MAIL ADDRESS OF RECEIVER |
| | (j-2) URL INFORMATION OF E-MAIL CONTENT CERTIFYING DEVICE | URL INFORMATION OF ACCESS DESTINATION FOR OBTAINING CONTENT-CERTIFIED E-MAIL NOTIFIED BY NOTICE |
| | (j-3) DIGITAL SIGNATURE OF E-MAIL CONTENT CERTIFYING DEVICE | DIGITAL SIGNATURE OF E-MAIL CONTENT CERTIFYING DEVICE FOR ALL THE ABOVE INFORMATION (j-1)–(j-2) |
| (e) DIGITAL CERTIFICATE INFORMATION | (e-2) DIGITAL CERTIFICATE OF E-MAIL CONTENT CERTIFYING DEVICE | DIGITAL CERTIFICATE OF E-MAIL CONTENT CERTIFYING DEVICE ISSUED BY AUTHORIZED VERIFICATION ORGANIZATION |

FIG. 14

BODY PORTION OF DELIVERY CERTIFICATION E-MAIL (k) DELIVERY CERTIFICATE INFORMATION
(k-1) IDENTIFIER OF E-MAIL CONTENT CERTIFYING DEVICE
(x-1) SENDER'S IDENTIFIER
(y-1) ACCEPTANCE DATE AND TIME
(y-2) TRANSFERENCE DATE AND TIME
(y-3) DELIVERY DATE AND TIME
(a-1) SENDER'S NAME
(a-2) SENDER'S ADDRESS
(a-3) SENDER'S E-MAIL ADDRESS
(b-1) RECEIVER'S NAME
(b-2) RECEIVER'S ADDRESS
(b-3) RECEIVER'S E-MAIL ADDRESS
(k-2) DIGITAL SIGNATURE OF E-MAIL CONTENT CERTIFYING DEVICE (e) DIGITAL CERTIFICATE INFORMATION
(e-1) SENDER'S DIGITAL CERTIFICATE
(e-2) DIGITAL CERTIFICATE OF E-MAIL CONTENT CERTIFYING DEVICE

FIG. 15

| INFORMATION TITLES | INFORMATION ITEMS | PARTICULARS |
|---|---|---|
| (k) DELIVERY CERTIFICATE INFORMATION | (k-1) IDENTIFIER OF E-MAIL CONTENT CERTIFYING DEVICE | IDENTIFIER USED IN IDENTIFYING E-MAIL CONTENT CERTIFYING DEVICE THAT CERTIFIES CONTENTS OF E-MAIL |
| | (x-1) SENDER'S IDENTIFIER | SENDER'S IDENTIFIER HAVING THE SAME VALUE NOTIFIED BY RECEIPT & USED IN IDENTIFYING CONTENT-CERTIFIED E-MAIL/THIS IDENTIFIER ENABLES SENDER TO JUDGE TO WHICH OF CONTENT-CERTIFIED E-MAILS THE DELIVERY CERTIFICATION HAS BEEN OBTAINED |
| | (y-1) ACCEPTANCE DATE AND TIME | INFORMATION OF DATE AND TIME WHEN E-MAIL CONTENT CERTIFYING DEVICE ACCEPTED CONTENT CERTIFICATION REQUEST E-MAIL |
| | (y-2) TRANSFERENCE DATE AND TIME | INFORMATION OF DATE AND TIME WHEN E-MAIL CONTENT CERTIFYING DEVICE SENT CONTENT-CERTIFIED E-MAIL TO RECEIVER'S E-MAIL ADDRESS SPECIFIED BY SENDER |
| | (y-3) DELIVERY DATE AND TIME | INFORMATION OF DATE AND TIME WHEN DELIVERY OF CONTENT-CERTIFIED E-MAIL SENT FROM E-MAIL CONTENT CERTIFYING DEVICE TO RECEIVER'S E-MAIL ADDRESS SPECIFIED BY SENDER IS CONFIRMED/WHEN DELIVERY IS NOT CONFIRMED, INVALID VALUE |
| | (a-1) SENDER'S NAME | NAME OF SENDER REQUESTING CONTENT CERTIFICATION |
| | (a-2) SENDER'S ADDRESS | ADDRESS OF SENDER |
| | (a-3) SENDER'S E-MAIL ADDRESS | E-MAIL ADDRESS OF SENDER |
| | (b-1) RECEIVER'S NAME | NAME OF RECEIVER TO BE RECEIVED CONTENT-CERTIFIED E-MAIL |
| | (b-2) RECEIVER'S ADDRESS | ADDRESS OF RECEIVER |
| | (b-3) RECEIVER'S E-MAIL ADDRESS | E-MAIL ADDRESS OF RECEIVER |
| | (j-2) DIGITAL SIGNATURE OF E-MAIL CONTENT CERTIFYING DEVICE | DIGITAL SIGNATURE OF E-MAIL CONTENT CERTIFYING DEVICE FOR ALL THE ABOVE INFORMATIONN (k-1)–(b-3) |
| (e) DIGITAL CERTIFICATE INFORMATION | (e-2) DIGITAL CERTIFICATE OF E-MAIL CONTENT CERTIFYING DEVICE | DIGITAL CERTIFICATE OF E-MAIL CONTENT CERTIFYING DEVICE ISSUED BY AUTHORIZED VERIFICATION ORGANIZATION |

CONTENT-CERTIFIED E-MAIL SERVICE SYSTEM

BACKGROUND OF THE INVENTION

1. Field of the Invention

The present invention relates to a content-certified e-mail (electronic mail) service system allowing a third party to certify objectively the contents of an e-mail sent from a sender to a destination on a network such as the Internet.

2. Description of the Related Background Art

In the current postal system in Japan, it is known that the content-certified postal service is available to have the text contents of a postal matter certified by the Ministry of Posts and Telecommunications. A content-certified mail can be an evidence as to what kind of contents that the mail has, a sender sent the mail and a receiver received the mail. Thus, the content-certified postal service is used particularly when delivering documents pertaining to law or a declaration of intent, or a record of the mailing date is necessary.

Recently, with wide spread use of e-commerce (electronic commerce), such an on-line mail-order service on the Internet, an increase in the cases is predicted, where notices pertaining to law, such as notices of cooling-off, are sent by e-mails. However, the e-mail system on the Internet has not established an organization for providing a service such as the current content-certified postal service to have the contents of a mail certified by a third party.

If a sender wants to use the current content-certified postal service, the sender has to (1) prepare a hard copy of text in triplicate, and (2) take the hard copy in triplicate to a postal office where postal matters are collected and delivered, or a postal office designated by the postmaster of a local post office. Thus, the current service is tedious and time-consuming for e-mail users. Because the current service is quite inconvenient, there has been a need to establish a system to have the contents of an e-mail certified in the original form of electronic media.

SUMMARY OF THE INVENTION

It is therefore an object of the present invention to provide a content-certified e-mail service system, in which the contents of a text of an e-mail can be certified readily in a reliable manner.

A content-certified e-mail service system according to the present invention is a content-certified e-mail service system having an e-mail content certifying device for certifying contents of a text of an e-mail sent from an e-mail terminal device at a sender's side to an e-mail terminal device at a receiver's side within a network, and characterized in that: the e-mail terminal device at the sender's side sends a content certification request e-mail containing an e-mail address of the e-mail terminal device at the receiver's side and a text of content certification to the e-mail content certifying device; and the e-mail content certifying device judges, upon receipt of the content certification request e-mail, whether there is any tampering with the text of content certification in the e-mail, and upon judging that there is no tampering with the text of content certification, saves registration information that contains the text of content certification in a storage device, while sending a content-certified e-mail that contains the text of content certification to the e-mail terminal device at the receiver's side, and a receipt e-mail that contains receipt information indicating that content certification has been effected to the e-mail terminal device at the sender's side.

According to the content-certified e-mail service system of the present invention, by merely sending a content certification request e-mail from the e-mail terminal device at the sender's side to the e-mail content certifying device, an e-mail containing a content-certified text is sent to the e-mail terminal device at the receiver's side. In addition, the e-mail content certifying device saves the content-certified text as the registration information. Consequently, the text of an e-mail can be certified readily in a reliable manner.

BRIEF DESCRIPTION OF THE DRAWINGS

FIG. 3 is a view showing an arrangement of the body portion of a content certification request e-mail;

FIG. 4 is a view showing information items contained in the body portion of the content certification request e-mail;

FIG. 5 is a view showing particulars in one set of registration information;

FIG. 6 is a view showing an arrangement of the body portion of a content-certified e-mail;

FIG. 7 is a view showing information items contained in the body portion of the content-certified e-mail;

FIG. 8 is a view showing an arrangement of the body portion of a receipt e-mail;

FIG. 9 is a view showing information items contained in the body portion of the receipt e-mail;

FIG. 10 is a view showing an arrangement of the body portion of a review request e-mail;

FIG. 12 is a view showing an arrangement of the body portion of a content certification notice e-mail;

FIG. 13 is a view showing information items contained in the body portion of the content certification notice e-mail;

FIG. 14 is a view showing an arrangement of the body portion of a delivery certification e-mail; and FIG. 15 is a view showing information items contained in the body portion of the delivery certification e-mail.

DETAILED DESCRIPTION OF THE PREFERRED EMBODIMENTS

The following description will describe embodiments of the present invention in detail with reference to the accompanying drawings.

Figure 1:
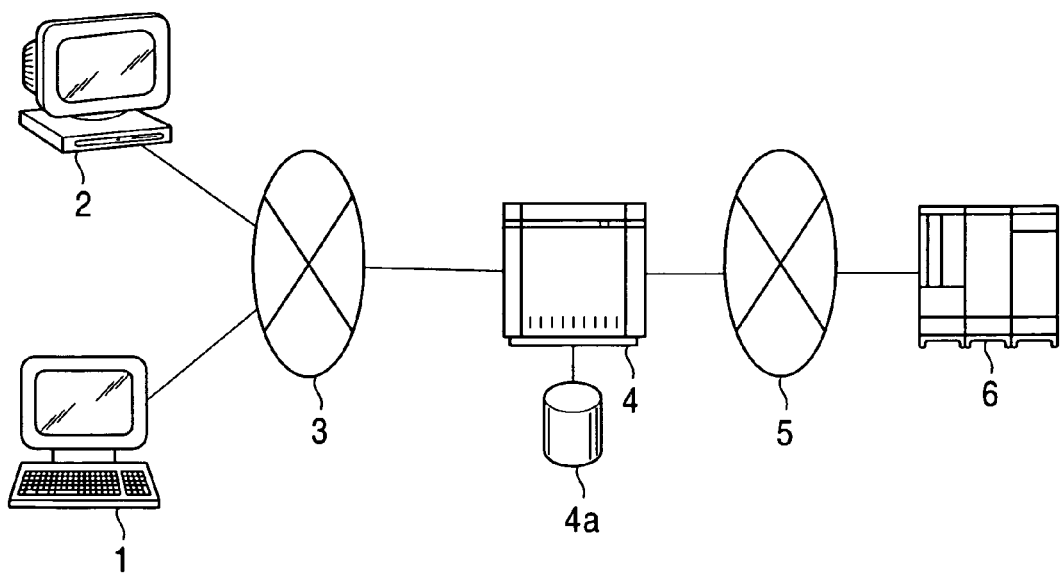
FIG. 1 is a view showing an arrangement of a content-certified e-mail service system of the present invention.

FIG. 1 shows a content-certified e-mail service system as an embodiment of the present invention. The content-certified e-mail service system includes e-mail terminal devices 1 and 2, a network 3 such as the Internet, an e-mail content certifying device 4, a special network 5 for settlement, and a settling device 6.

The e-mail terminal devices 1 and 2 may be the same devices, and for example, are composed of personal computers and connected to the network 3 separately. In the present embodiment, the e-mail terminal device 1 is used as a terminal device at a sender's side and the e-mail terminal device 2 as a terminal device at a receiver's side for ease of explanation. It should be appreciated, however, that each of the terminal devices 1 and 2 can be either the one at the sender's side or receiver's side, or at the both sides.

The e-mail content certifying device 4 is connected to the network 3. The e-mail content certifying device 4 is a server that transfers an e-mail sent from the e-mail terminal device 1 at the sender's side to the e-mail terminal device 2 at the receiver's side through the network 3 with the contents of the e-mail certified. Also, the e-mail content certifying device 4 includes a storage device 4a, in which a content certificate database is formed as will be described below.

Both of the e-mail content certifying device 4 and settling device 6 are connected to the special network 5. The special network 5 is an independent network distinguished from the other networks such as the network 3. The settling device 6 is composed of a host computer in a credit card company, and settles a payment of the content-certified e-mail service fee.

Figure 2:
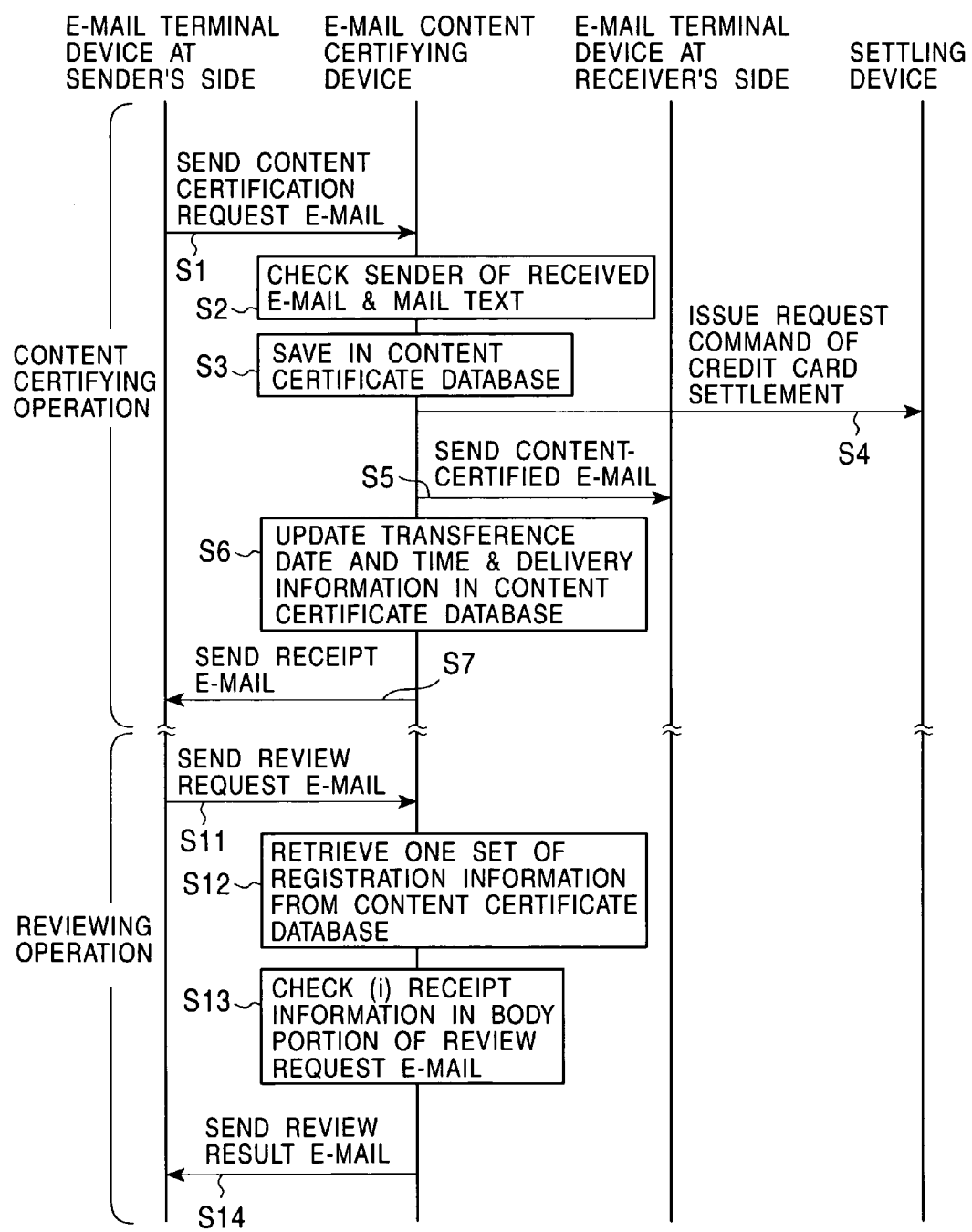
FIG. 2 is a flowchart showing a content certifying operation and a reviewing operation.

Next, the following description will describe an operation of the e-mail content certification service effected by the above-arranged system of the present invention with reference to FIG. 2.

In response to sender's manipulation, the e-mail terminal device 1 at the sender's side sends a content certification request e-mail to the e-mail content certifying device 4 (Step S1). The content certification request e-mail is sent by using a mail encryption protocol such as S/MINE. As shown in FIG. 3, the body portion of the content certification request e-mail contains: (a) sender's information; (b) receiver's information; (c) settlement information; (d) text information of content certification; and (e) digital certificate information. The body portion having the foregoing information items is cited in FIG. 4.

The content certification request e-mail sent from the e-mail terminal device 1 at the sender's side is supplied to the e-mail content certifying device 4 through the network 3. When the content certification request e-mail is sent from the e-mail terminal device 1, the e-mail address of the e-mail content certifying device 4 is set in the e-mail terminal device 1 at the sender's side as a destination.

Upon receipt of the content certification request e-mail, the e-mail content certifying device 4 checks the sender by using the (a) sender's information, (d) text information of content certification, and (e) digital certificate information in the body portion of the received content certification request e-mail, and at the same time, checks if there is any tampering with (d-1) text (Step S2). The e-mail terminal device 1 at the sender's side computes the (d-1) text by a predetermined algorithm, encrypts the computation result, and incorporates the encrypted information in (d-2) sender's digital signature. Hence, the e-mail content certifying device 4 retrieves the encrypted information from the (d-2) sender's digital signature to decrypt the encrypted information, and obtains the computation result by the e-mail terminal device 1 at the sender's side. At the same time, the e-mail content certifying device 4 actually computes the (d-1) text by using a predetermined algorithm, and checks if there is any tampering with the (d-1) text by comparing the former computation result with the latter computation result. Further, the e-mail content certifying device 4 generates (x-1) sender's identifier and (x-2) receiver's identifier, and saves all the information including these identifiers as shown in FIG. 5 in the storage device 4a as one set (one record) of registration information (Step S3). The registration information is contained in the content certificate database as a certified copy of the content certificate. The period of preservation of the registration information in the content certificate database is, for example, five years. Each of the (x-1) sender's identifier and (x-2) receiver's identifier is an identifier used in retrieving one set of registration information from a plurality sets of registration information saved in the content certificate database. Of all the information shown in FIG. 5, not only the (x-1) sender's identifier and (x-2) receiver's identifier, but also (y-1) acceptance date and time, (y-2) transference date and time, (y-3) delivery date and time, and (z-1) delivery information are generated in the e-mail content certifying device 4.

The e-mail content certifying device 4 issues a request command for a credit card settlement to the settling device 6 (Step S4). The request command uses (c-1) sender's credit card number and (c-2) PIN (Personal Identification Number) of the credit card in the (c) settlement information contained in the body portion of the received content certification request e-mail. The request command sent from the e-mail content certifying device 4 is supplied to the settling device 6 through the special network 5. The settling device 6 settles a payment of the fee for the service provided to the sender of the content certification request e-mail.

The e-mail content certifying device 4 sends a content-certified e-mail to the destination specified by (b-3) receiver's e-mail address (Step S5). The content-certified e-mail is sent by using a mail encryption protocol such as S/MINE. Also, as shown in FIG. 6, the body portion of the content-certified e-mail contains (h) content certificate information, (d) text information of content certification, and (e) digital certificate information. Each of the foregoing information items is cited in FIG. 7.

The content-certified e-mail sent from the e-mail content certifying device 4 is saved in a storage region corresponding to the (b-3) receiver's e-mail address in an unillustrated receiver's mail server through the network 3. If the e-mail address coincides with the e-mail address of the receiver using the e-mail terminal device 2 at the receiver's side, in response to a receiver's manipulation, the e-mail terminal device 2 at the receiver's side accesses the storage region corresponding to the (b-3) receiver's e-mail address in the receiver's mail server through the network 3, and reads out the content-certified e-mail saved in the storage region.

Upon receipt of the content-certified e-mail, the receiver can confirm that there is no tampering with the (h) content certificate information and the (d-1) text of content certification sent from the sender, based on the foregoing information.

Upon sending of the content-certified e-mail, the e-mail content certifying device 4 updates the (y-2) transference date and time and (z-1) delivery information in the corresponding record within the content certificate database (Step S6).

In addition, the e-mail content certifying device 4 sends a receipt e-mail to the address specified by the (a-3) sender's e-mail address (Step S7). The receipt e-mail is sent by using a mail encryption protocol such as S/MINE. In addition, as shown in FIG. 8, the body portion of the receipt e-mail includes (i) receipt information, (d) text information of content certification, and (e) digital certificate information. Each of the foregoing information items is cited in FIG. 9.

The receipt e-mail sent from the e-mail content certifying device 4 is saved in a storage region corresponding to the (a-3) sender's e-mail address in an unillustrated sender's mail server through the network 3. If the e-mail address coincides with the e-mail address of the sender using the e-mail terminal device 1 at the sender's side, in response to a sender's manipulation, the e-mail terminal device 1 at the sender's side accesses the storage region corresponding to the (a-3) sender's e-mail address in the sender's mail server through the network 3, and reads out the receipt e-mail saved in the storage region.

The sender who received the receipt e-mail can confirm that there is no tampering with the (i) receipt information and the (d-1) text of content certification, based on the foregoing information.

Also, the sender is allowed to review a certified copy saved in the content certificate database later if the sender presents the receipt in the text of the receipt e-mail received from the e-mail content certifying device 4 by reviewing means described below.

Next, the following description will describe a reviewing operation that allows the sender to review the certified copy.

In response to a sender's manipulation, the e-mail terminal device 1 at the sender's side sends a review request e-mail to the e-mail content certifying device 4 (Step S11). The review request e-mail is sent by using a mail encryption protocol such as S/MINE. Also, as shown in FIG. 10, the body portion of the review request e-mail contains the (i) receipt information.

The review request e-mail sent from the e-mail terminal device 1 at the sender's side is supplied to the e-mail content certifying device 4 through the network 3.

Upon receipt of the review request e-mail, the e-mail content certifying device 4 retrieves one set of registration information from the content certificate database based on the (x-1) sender's identifier in the (i) receipt information presented in the body portion of the e-mail (Step S12). As previously mentioned, each set of registration information contains the (x-1) sender's identifier and (x-2) receiver's identifier. This makes it possible to retrieve one set of registration information corresponding to the (x-1) sender's identifier. Upon retrieval of the corresponding set of registration information, the e-mail content certifying device 4 checks whether the (i) receipt information in the body portion of the received review request e-mail is correct or not (Step S13). The check is performed by using the (e-2) digital certificate of the e-mail content certifying device contained in the retrieved registration information and (i-2) the digital signature of the e-mail content certifying device in the (i) receipt information in the body portion of the received review request e-mail.

Upon check of the (i) receipt information in the body portion of the review request e-mail received in Step S13, the e-mail content certifying device 4 sends a review result e-mail to the address specified by the (a-3) sender's e-mail address (Step S14). The review result e-mail is sent by using a mail encryption protocol such as S/MINE. Also, the information items contained in the body portion of the review result e-mail are the same as those in the receipt e-mail cited in FIG. 8.

The review result e-mail sent from the e-mail content certifying device 4 is read out by the e-mail terminal device 1 at the sender's side from the storage region corresponding to the (a-3) sender's e-mail address in the sender's mail server in the same manner as the foregoing receipt e-mail.

Upon receipt of the review result e-mail, the sender can confirm the (d-1) text of content certification from the text therein.

According to the above embodiment, by constructing the e-mail content certifying device 4 under administration of a third party on the network 3, e-mail users who wish to send a content-certified e-mail can use the content-certified e-mail delivery service by merely sending a content certification request e-mail to the e-mail content certifying device 4, so that the contents of an e-mail is certified by a third party and a content-certified e-mail is sent to the destination. Consequently, unlike the current content-certified postal service, the e-mail users can save time and labor in (1) preparing a hard copy of text in triplicate and (2) taking the hard copy in triplicate to a post office. Hence, convenience of each of the e-mail users is increased, and a notice pertaining to law such as a notice of cooling off can be sent by an e-mail. Thus, more extensive use of e-mails can be expected.

In the foregoing first embodiment, it is generally difficult to confirm at the sender's side whether a content-certified e-mail has been correctly delivered to the destination on the Internet in a secure manner. However, delivery certification of a content-certified e-mail can be realized in the same manner as a delivery-certified mail in the current postal service if the e-mail content certifying device 4 is furnished with a function to serve as a Web server and the e-mail terminal device 2 at the receiver's side is provided with a Web browser.

Figure 11:
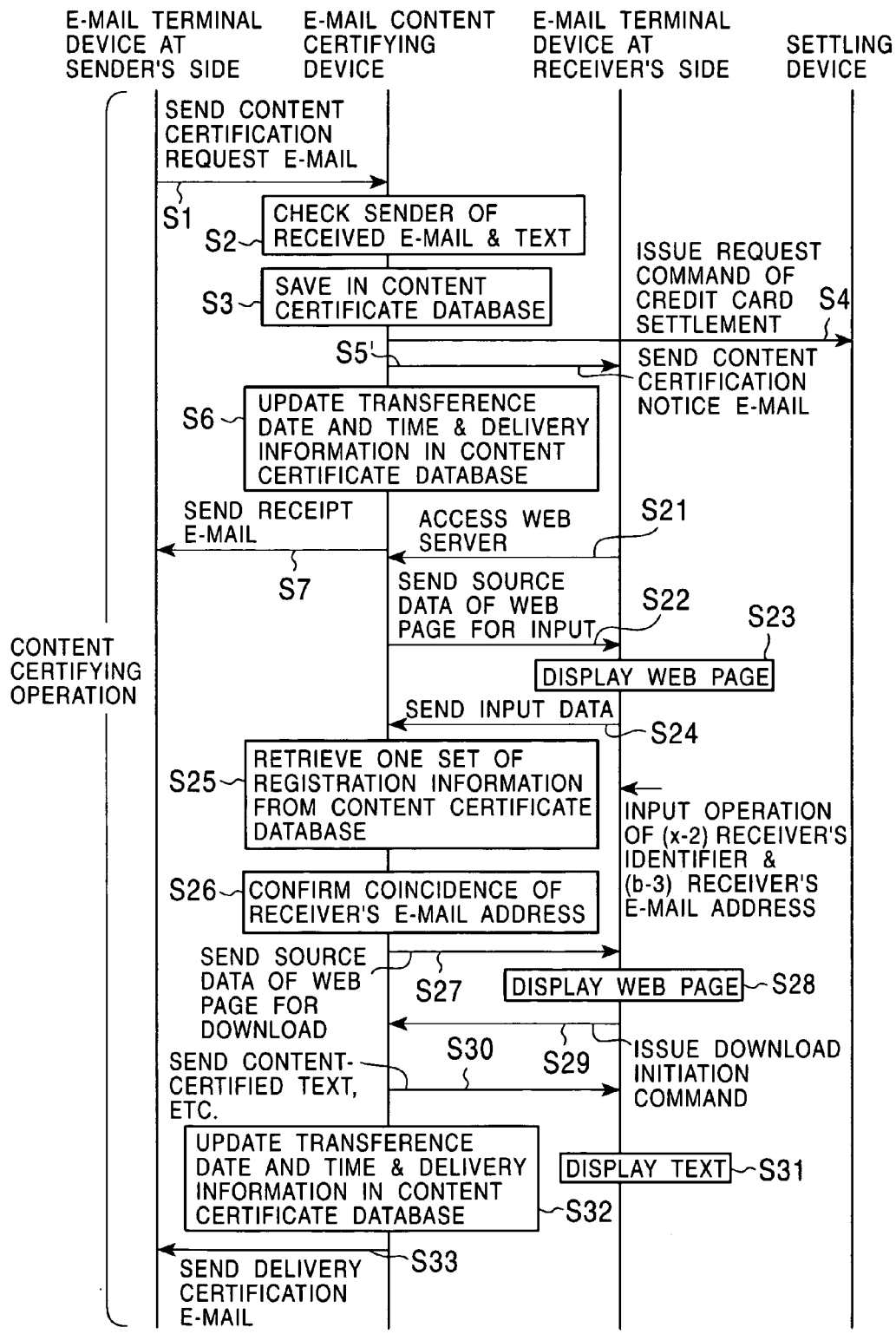
FIG. 11 is a flowchart showing a content certifying operation.

Next, the following description will describe, with reference to FIG. 11, an operation of the e-mail content certification service that realizes delivery certification as another embodiment of the present invention.

In the operation of the e-mail content certification service realizing delivery certification, the actions cited in Steps S1 through S4 in FIG. 2 are also carried out.

After Step S4, the e-mail content certifying device 4 does not act as cited in Step S5 in FIG. 2, but sends a content certification notice e-mail to the destination specified by the (b-3) receiver's e-mail address (Step S5'). The content certification notice e-mail is sent by using a mail encryption protocol such as S/MINE. Also, as shown in FIG. 12, the body portion of the content certification notice e-mail contains (j) content certification notice information and (e) digital certificate information. Each of the foregoing information items is cited in FIG. 13.

The content certification notice e-mail sent from the e-mail content certifying device 4 is read out by the e-mail terminal device 2 at the receiver's side from the storage region corresponding to the (b-3) receiver's e-mail address in the receiver's mail server in the same manner as the content-certified e-mail.

Upon receipt of the content certification notice e-mail, the receiver confirms that there is no tampering with the (j) content certification notice information and the (d-1) text of content certification sent from the sender based on the foregoing information.

Upon sending of the content certification notice e-mail, the e-mail content certifying device 4 updates the (y-2) transference date and time and (z-1) delivery information in the corresponding record in the content certificate database (Step S6). This action is identical with Step S6 cited in FIG. 2.

Upon receipt of the content certification notice e-mail, the e-mail terminal device 2 at the receiver's side accesses the Web server in the e-mail content certifying device 4 in response to a receiver's manipulation (Step S21). The access destination is located in a region within the Web server indicated by (j-2) URL information of the e-mail content certifying device 4 in the (j) content certification notice information in the body portion of the content certification notice e-mail. This access is gained by the e-mail terminal device 2 at the receiver's side through the network 3.

The Web server in the e-mail content certifying device 4 sends source data that contains an HTML file of the accessed URL to the e-mail terminal device 2 at the receiver's side (Step S22). The source data is supplied to the e-mail terminal device 2 at the receiver's side from the e-mail content certifying device 4 through the network 3.

The e-mail terminal device 2 at the receiver's side receives the source data sent from the Web server and displays an Web page on the display screen (Step S23). The receiver can input information on the Web page for the information items: the (x-2) receiver's identifier and (b-3) receiver's e-mail address.

By manipulating keys, the receiver inputs characters on the Web page for the information items: the (x-2) receiver's identifier and (b-3) receiver's e-mail address. When the receiver completes the input manipulation for all the input items, the receiver manipulates a sending button displayed on the Web page by manipulating the key or mouse pointer, whereupon the input data, that is, the (x-2) receiver's identifier and (b-3) receiver's e-mail address, is sent to the e-mail content certifying device 4 from the e-mail terminal device 2 at the receiver's side (Step S24). The input data is sent by using a encryption protocol such as SSL (Secure Sockets Layer).

Upon receipt of the input data, the e-mail content certifying device 4 retrieves one set of registration information corresponding to the (x-2) receiver's identifier contained in the input data from the content certificate database (Step S25). Upon retrieval of the corresponding set of registration information, the e-mail content certifying device 4 detects whether the (b-3) receiver's e-mail address contained in the retrieved set of registration information coincides with the (b-3) receiver's e-mail address in the received input data (Step S26), by which the e-mail content certifying device 4 can confirm that the receiver is correct.

Upon detection of the coincidence of the (b-3) receiver's e-mail address in Step S26, the Web server in the e-mail content certifying device 4 sends source data, including an HTML file that allows downloading of the (d-1) text of content certification, (d-2) sender's digital signature, and (e-1) sender's digital certificate all contained in the set of registration information retrieved in Step S25, to the e-mail terminal device 2 at the receiver's side (Step S27). More specifically, a new URL is specified to the Web server from the e-mail terminal device 2 at the receiver's side by the receiver's sending manipulation in Step S24. Thus, if the source data that allows downloading is placed in the new URL region, the source data is sent to the e-mail terminal device 2 at the receiver's side. The source data is supplied from the e-mail content certifying device 4 to the e-mail terminal device 2 at the receiver's side through the network 3.

The e-mail terminal device 2 at the receiver's side receives the source data sent from the Web server and displays a Web page on the display screen (Step S28). This Web page displays a message to request the receiver to download the text of the content-certified e-mail.

When the receiver manipulates a download OK button displayed on the Web page with the key or mouse pointer, a download initiation command is sent to the e-mail content certifying device 4 from the e-mail terminal device 2 at the receiver's side (Step S29).

Upon receipt of the download initiation command, the e-mail content certifying device 4 sends the (d-1) text of content certification, (d-2) sender's digital signature, and (e-1) sender's digital certificate to the e-mail terminal device 2 at the receiver's side (Step S30).

The e-mail terminal device 2 at the receiver's side receives the (d-1) text of content certification, (d-2) sender's digital signature, and (e-1) sender's digital certificate sent from the e-mail content certifying device 4, and displays at least the (d-1) text of content certification on the display screen (Step S31).

Upon completion of the sending action in Step S30, the e-mail content certifying device 4 updates the (y-2) transference date and time and (z-2) delivery information in the corresponding record within the content certificate database (Step S32), and sends a delivery certification e-mail to the address specified by the (a-3) sender's e-mail address (Step S33). The delivery certification e-mail is sent by using a mail encryption protocol such as S/MINE. Also, as shown in FIG. 14, the body portion of the delivery certification e-mail contains (k) delivery certificate information and (e) digital certificate information. Each of the foregoing information items is cited in FIG. 15.

The delivery certification e-mail sent from the e-mail content certifying device 4 is read out by the e-mail terminal device 1 at the sender's side from the storage region corresponding to the (a-3) sender's e-mail address in the sender's mail server in the same manner as the foregoing receipt e-mail.

Upon receipt of the delivery certification e-mail, the sender can confirm that the (d-1) text of content certification has been delivered to the receiver based on the foregoing information.

The reviewing operation that allows the sender to review a certified copy is omitted in FIG. 11. It should be appreciated, however, that the reviewing operation is carried out in the same manner as was explained in the first embodiment.

As has been discussed, according to the second embodiment, the e-mail terminal device 2 at the receiver's side uses the Web browser, so that the receiver retrieves the text of the content-certified e-mail by the receiver's manipulation. This makes it possible to determine the exact date and time the receiver received the text of the content-certified e-mail. Consequently, a delivery certificate as an evidence of the delivery of the content-certified e-mail to the receiver can be issued to the sender, and the same function as the delivery-certified mail in the current postal service can be realized on the Internet. Hence, the e-mail users can send a notice that requires a record of the delivery date by an e-mail.

In addition, by combining the first and second embodiments, a content-certified e-mail having its contents certified by a third party with a delivery certificate can be sent/received through the e-mail service on the Internet, thereby making it possible to send a notice pertaining to law or the like by an e-mail. Accordingly, e-mails are used extensively, and the e-mail users' convenience can be increased.

In the first embodiment, the reviewing operation of the content-certified e-mail was explained by way of the e-mail sending/receiving method between the e-mail terminal device 1 at the sender's side and e-mail content certifying device 4. However, the reviewing operation can be effected also by furnishing the e-mail terminal device 1 at the sender's side with a function serving as the Web browser, and the e-mail content certifying device 4 with a function serving as the Web server.

As has been discussed, in the content-certified e-mail service system of the present invention, an e-mail containing the content-certified text is sent to the e-mail terminal device at the receiver's side by merely sending a content certification request e-mail from the e-mail terminal device at the sender's side to the e-mail content certifying device. Also, the content-certified text is saved in the e-mail content certifying device as the registration information. Consequently, the contents of a text of an e-mail can be certified readily in a reliable manner.

What is claimed is:

1. A content-certified e-mail service system having an e-mail content certifying device for certifying contents of a text of an e-mail sent from an e-mail terminal device at a sender's side to an e-mail terminal device at a receiver's side within a network, wherein:

said e-mail terminal device at the sender's side sends a content certification request e-mail to said e-mail content certifying device, said content certification request e-mail containing an e-mail address of said e-mail terminal device at the receiver's side and a text of content certification;

said e-mail content certifying device judges, upon receipt of said content certification request e-mail, whether there is any tampering with said text of content certification in said e-mail;

said e-mail content certifying device, upon judging that there is no tampering with said text of content certification, saves registration information that contains said text of content certification in a storage device, sends a content-certified e-mail that contains said text of content certification to said e-mail terminal device at the receiver's side, and sends a receipt e-mail that contains receipt information indicating that content certification has been effected to said e-mail terminal device at the sender's side;

said e-mail terminal device at the sender's side sends a review request e-mail to said e-mail content certifying device, said review request e-mail containing said receipt information in said receipt e-mail;

said e-mail content certifying device, upon receipt of said review request e-mail, retrieves one set of registration information corresponding to an identifier in said review request e-mail from said storage device, and judges whether there is any tampering with the receipt information in said review request e-mail based on said one set of registration information retrieved; and said e-mail content certifying device, upon judging that there is no tampering with the receipt information in said review request e-mail, sends an e-mail containing said text of content certification to said e-mail terminal device at the sender's side.

2. The content-certified e-mail service system according to claim 1, wherein:

said e-mail content certifying device issues a settlement request command to a settling institution to settle a fee for a content certifying operation of the text of the e-mail on a credit card.

3. A content-certified e-mail service system having an e-mail content certifying device for certifying content of a text of an e-mail sent from an e-mail terminal device at a sender's side to an e-mail terminal device at a receiver's side within a network, wherein:

said e-mail terminal device at the sender's side sends a content certification request e-mail to said e-mail content certifying device, said content certification request e-mail containing an e-mail address of said e-mail terminal device at the receiver's side and a text of content certification;

said e-mail content certifying device judges, upon receipt of said content certification request e-mail, whether there is any tampering with said text of content certification in said e-mail;

said e-mail content certifying device, upon judging that there is no tampering with said text of content certification, saves registration information that contains said text of content certification in a storage device, sends a content certification notice e-mail containing an access destination in a Web server and an access key for specifying a receiver to said e-mail terminal device at the receiver's side, and sends a receipt e-mail containing receipt information indicating that content certification has been effected to said e-mail terminal device at the sender's side;

said e-mail terminal device at the receiver's side, upon receipt of said content certification notice e-mail, accesses said Web server using the access destination in said e-mail, and sends said access key to said e-mail content certifying device through a Web page;

said e-mail content certifying device, upon receipt of said access key from said e-mail terminal device at the receiver's side, retrieves from said storage device one set of registration information corresponding to said access key received, and allows downloading by said e-mail terminal device at the receivers side of said text of content certification contained in said one set of registration information retrieved;

said e-mail terminal device at the sender's side sends a review request e-mail to said e-mail content certifying device, said review request e-mail containing receipt information in said receipt e-mail;

said e-mail content certifying device, upon receipt of said review request e-mail, retrieves one set of registration information corresponding to an identifier in said review request e-mail from said storage device, and judges whether there is any tampering with the receipt information in said review request e-mail based on said one set of registration information retrieved; and said e-mail content certifying device, upon judging that there is no tampering with the receipt information in said review request e-mail, sends an e-mail containing said text of content certification to said e-mail terminal device at the sender's side.

4. The content certified e-mail service system according to claim 3, wherein:

said access key contains a receiver's identifier and a receiver's e-mail address;

and said e-mail content certifying device retrieves from said storing device one set of registration information corresponding to said receiver's identifier in said access key received, and judges whether the receiver's e-mail address in said access key received coincides with the receiver's e-mail address in said one set of registration information retrieved, said e-mail content certifying device allowing said downloading only when coincidence is confirmed.

5. The content-certified e-mail service system according to claim 3, wherein:

said e-mail content specifying device, after confirming said downloading by said e-mail terminal device at the receiver's side of said text of content certification, send a delivery certification e-mail to said e-mail terminal device at the sender's side.

* * * * *